PRINTING TELEGRAPH SIGNAL MUTATOR

Original Filed Sept. 13, 1955 5 Sheets-Sheet 1

*Inventor:*
*Edward N. Dingley, Jr.*

Oct. 11, 1960 E. N. DINGLEY, JR 2,956,121
PRINTING TELEGRAPH SIGNAL MUTATOR
Original Filed Sept. 13, 1955 5 Sheets-Sheet 2
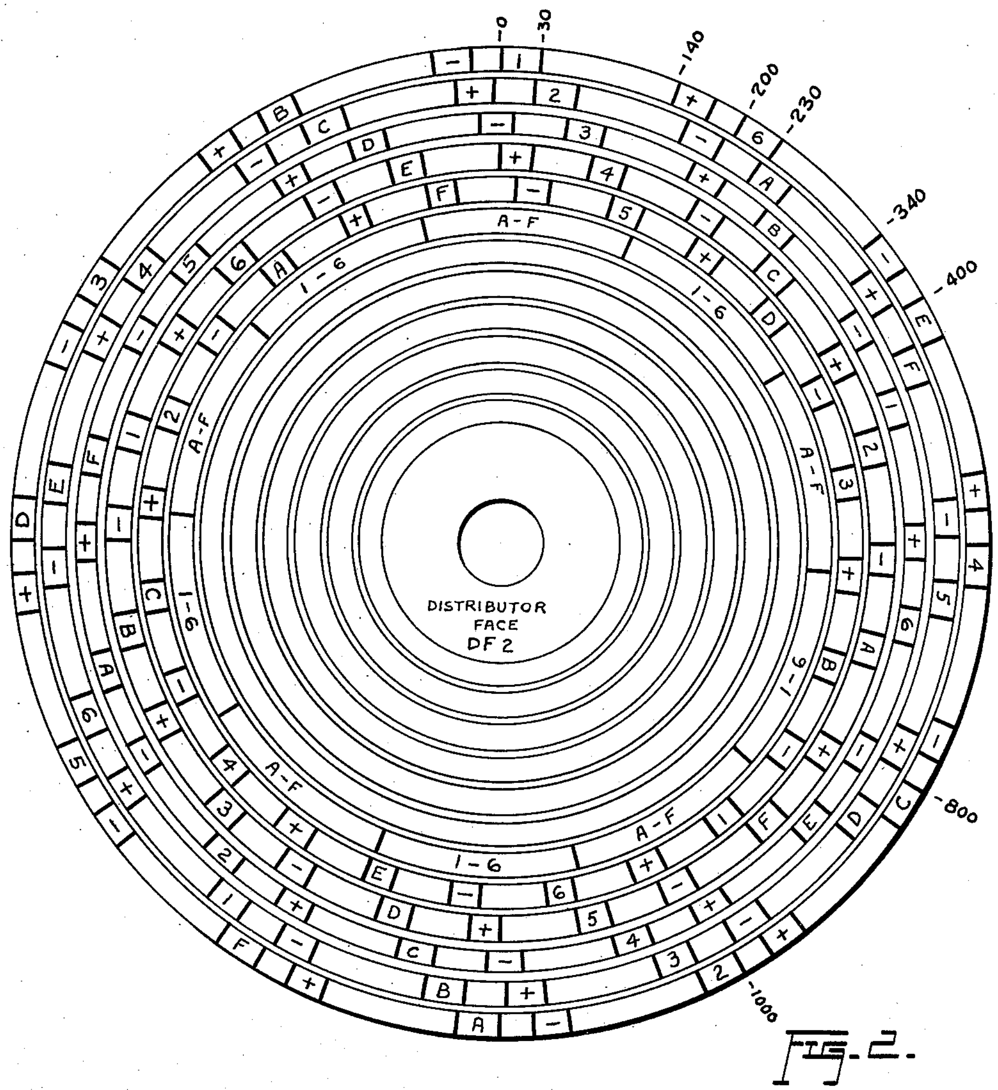
FIG. 2.
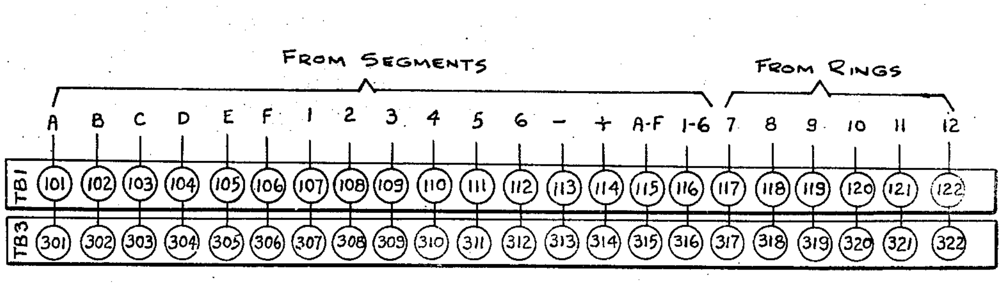
Inventor:
Edward N. Dingley, Jr.

Inventor:
Edward N. Dingley, Jr.

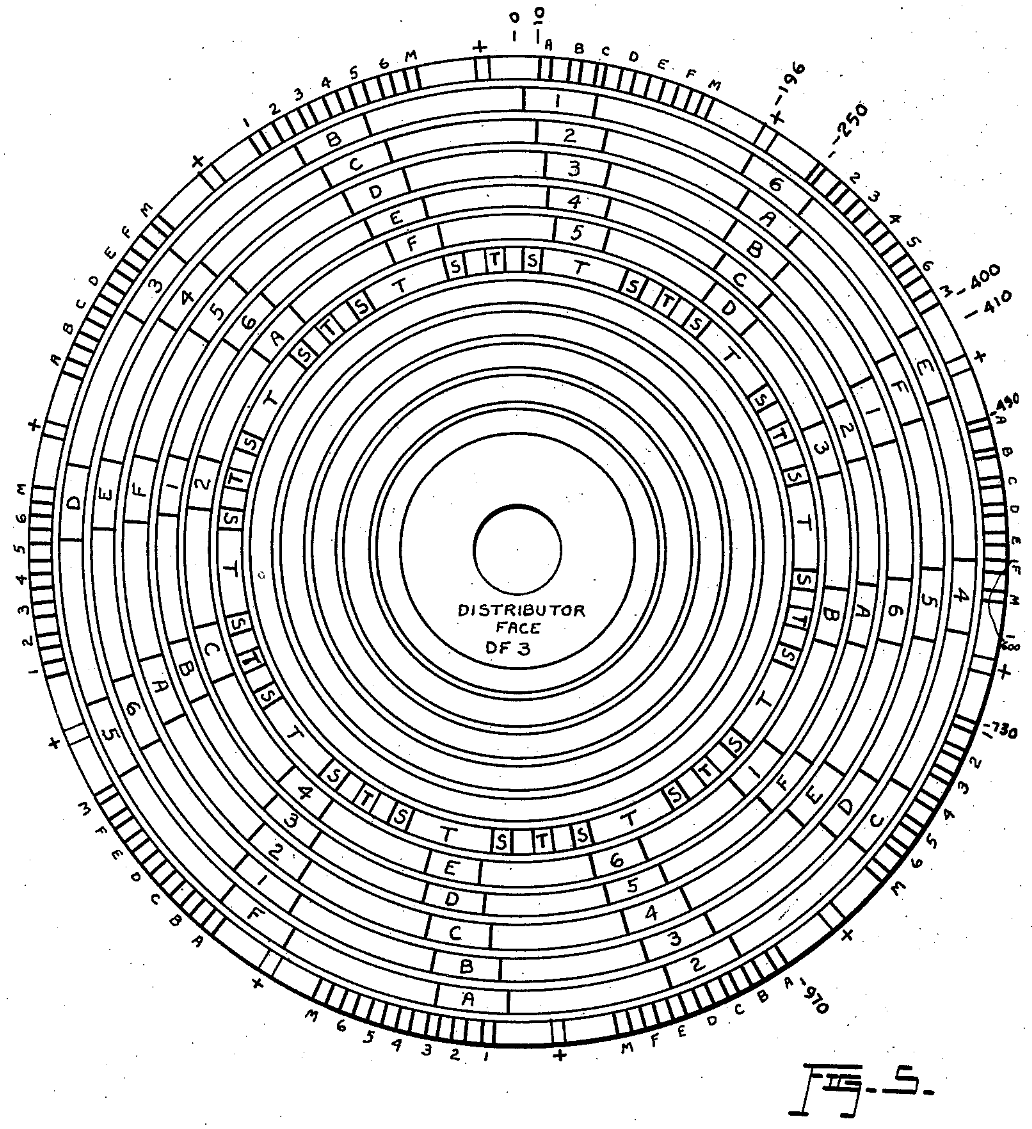
FIG. 5.
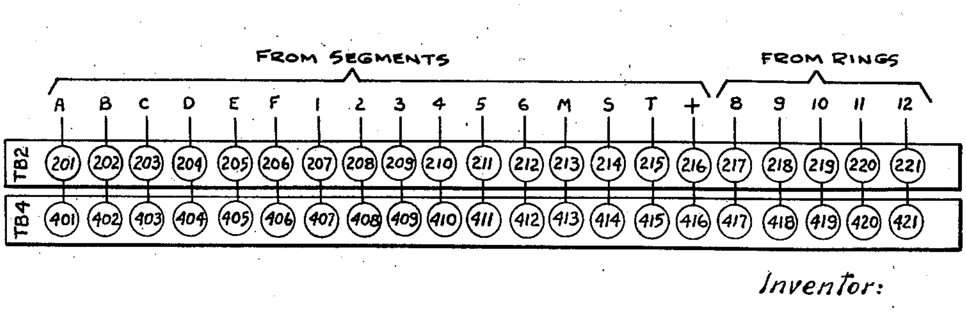
Inventor:
Edward N. Dingley, Jr.

PRINTING TELEGRAPH SIGNAL MUTATOR

Original Filed Sept. 13, 1955 5 Sheets-Sheet 5

Inventor:
Edward N. Dingley, Jr.

United States Patent Office 2,956,121

Patented Oct. 11, 1960

2,956,121

PRINTING TELEGRAPH SIGNAL MUTATOR

Edward N. Dingley, Jr., 11165 4th St. E., Treasure Island, St. Petersburg 6, Fla.

Continuation of application Ser. No. 534,137, Sept. 13, 1955. This application Apr. 22, 1959, Ser. No. 808,271

15 Claims. (Cl. 178—26)

British patent specification Serial 670,759 (U.S. Patent 2,609,451) describes the four-channel military type AN/FGC–5 electronic time-division multiplex that processes six sequential elements or pulses of information per channel per multiplex cycle. Each channel of such a multiplex is equivalent to a single channel 6-unit synchronous transmission facility. Each sending channel of the multiplex is provided with electronic "start-stop to synchronous" converters and each receiving channel of the multiplex is provided with electronic "synchronous to start-stop" converters. These converters provide the means whereby a single channel start-stop teleprinter sender situated at a distance from the multiplex sender may send signals through a channel of the multiplex, at any character rate that is less than the multiplex rate, to a single channel start-stop teleprinter receiver that is also situated at a distance from the multiplex receiver. Of the six elements or pulses of information that traverse a channel of the AN/FGC–5 multiplex during each multiplex cycle, five pulses define the character being transmitted and the sixth pulse indicates whether the character (be it a Blank or other) was originated by the distant sending teleprinter or whether it (being a Blank) was originated by the sending multiplex and hence should be deleted by the receiving "synchronous to start-stop" converter. Time differential or service Blanks wherein all six elements are spacing are originated by the sending multiplex whenever the distant sending teleprinter is idle or whenever speed differences result in the multiplex gaining phase over the sending teleprinter by one full character. "Traffic Blanks," wherein the five selection elements are spacing but the sixth pulse is marking, can be originated only when the distant sending teleprinter sends start-stop Blanks. Traffic Blanks are recognized as such by the receiving "synchronous to start-stop" converter which responds by sending start-stop Blanks to the distant receiving teleprinter.

In consequence of the foregoing it will be noted that the AN/FGC–5 multiplex provides, through any one of its channels, a start-stop teleprinter signal transmission facility between a remote sending teleprinter and a remote receiving teleprinter and that all 32 code combinations of the conventional start-stop teleprinter code may be transmitted through the facility.

The following paragraphs will discuss means whereby service similar to that provided by the AN/FGC–5 can be provided by a submarine cable-multiplex.

Most submarine cable-multiplexes utilize mechanical segmented distributors that provide for only five pulses per character per channel. Each channel of such a multiplex is equivalent to a single channel 5-unit synchronous transmission facility. The sending teleprinters are usually adjacent to the sending multiplex in order that they may be conveniently synchronized to the sending multiplex after the manner described in British patent specification 670,758.

In those instances when it is necessary or desirable to situate a sending teleprinter at a distance from the sending cable-multiplex, it is entirely feasible to associate with the assigned channel of the sending multiplex a "start-stop to synchronous" converter which will accept start-stop teleprinter signals from the distant sending teleprinter. The resulting 5-unit facility, however, can process only 31 of the 32 code combinations of the conventional teleprinter code because the "synchronous to start-stop" converter associated with the receiving multiplex would have no way of differentiating between "traffic Blanks" and "time differential or service Blanks." The reasons for this are described in British patent specification 670,762.

In order to provide the desired 32 character start-stop teleprinter service between remote subscribers through a synchronous transmission facility, it is necessary to process six pulses per character per channel. In the past, 6-unit service has been provided in a few submarine multiplex channels by changing from five to six the number of segments provided for a particular channel in the distributor face plates of the sending and receiving multiplexes and by associating with the sending and receiving multiplexes "start-stop to synchronous" converters and "synchronous to start-stop" converters that are compatible with the 6-unit multiplex channel. This solution is disadvantageous because it increases the cable circuit pulse rate; because the multiplex channel so modified cannot be used in the normal 5-unit cable-multiplex mode; and because no alternate channels are available to provide 6-unit service.

Accordingly, an object of this invention is to provide a sending and receiving synchronous telegraph code transmuting device or mutator whereby 6-unit service may be achieved through a 5-unit synchronous transmission facility.

Another object of this invention is to provide a sending "start-stop to synchronous" telegraph code converter whereby the start element and the five selection elements, a total of six elements, of the conventional start-stop teleprinter code may be introduced into the sending unit of the synchronous mutator.

Another object of this invention is to provide a receiving "synchronous to start-stop" telegraph code converter whereby the six unit synchronous signals delivered by the receiving mutator may be converted to signals of the conventional start-stop teleprinter code.

Another object of this invention is to provide an ancillary unit of equipment that may be associated with any five unit sending channel of a (submarine cable) multiplex for the purpose of obtaining six unit service, and to accomplish the association without modifying the multiplex or its pulse rate and without rendering the channel unsuitable for subsequent use as a five unit channel.

Another object of this invention is to provide an ancillary unit of equipment that may be associated with any five unit receiving channel of a (submarine cable) multiplex for the purpose of obtaining six unit service, and to accomplish the association without modifying the multiplex or its pulse rate and without rendering the channel unsuitable for subsequent use as a five unit channel.

The invention accordingly provides printing telegraph signal transmission apparatus, which incorporates a synchronous $n$-unit transmission facility or multiplex equipment per channel, adapted for transmission therethrough of start-stop telegraph code signals wherein the start and selection elements consist of $n+x$ signal elements ($x$ and $n$ being whole numbers greater than zero) and which comprises a plurality of signal input storage-devices, means for applying to said storage devices successively the $n+x$ signal elements of successive start-stop telegraph code signals, means synchronized with said synchronous transmission facility for extracting said signal elements from said input storage devices in groups of $n$ elements each and transmitting same to said transmission facility, a plurality of reception storage devices and means for storing therein successively said $n$-element signal groups transmitted by said facility, means for extracting said signal elements from said reception storage devices in groups of $n+x$ elements, and means controlled by said latter extracting means for locally generating additional signal elements to reproduce, with said last-mentioned groups, start-stop telegraph code signals each consisting of $n+x$ signal elements plus a stop element.

The invention will be more fully understood from the following detailed description of an exemplary embodiment thereof when read in conjunction with the accompanying drawings in which Figures 1 and 2 illustrate schematically the sending apparatus when interconnected through terminal boards TB1 and TB3;

Figure 3 illustrates schematically the wiring of relays K1 to K5, inclusive, of Figure 1;

Figures 4 and 5 illustrate schematically the receiving apparatus when interconnected through terminal boards TB2 and TB4;

I call my invention a printing telegraph signal mutator, and I will herein refer to the device as "the mutator" and to certain of its parts as "the sending mutator" and as "the receiving mutator."

Figure 1:
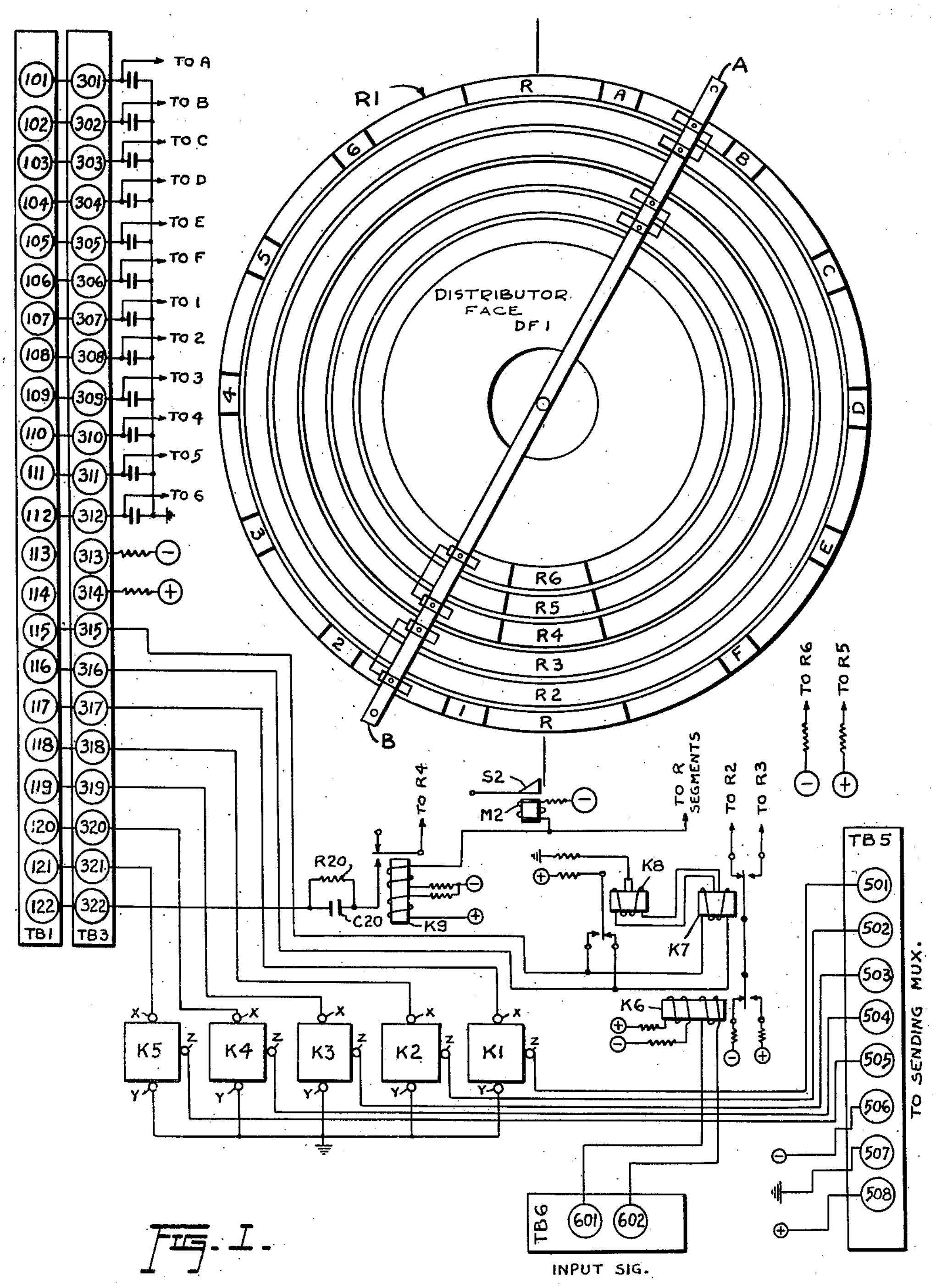

In the preferred embodiment of my invention, the signals to be sent over a five unit multiplex channel enter the sending mutator at terminal board TB6 of Figure 1 and traverse the signal winding of polar relay K6 which is provided with a conventional bias winding that is used in conjunction with neutral signals and not used in conjunction with polar signals.

The armature of relay K6 conveys polar replicas of the incoming signals to the armature of polar relay K7 where they are impressed on either ring R2 or ring R3 (depending on the tongue position of relay K7) of the distributor face DF1 illustrated in Figure 1. Whenever the accompanying figures depict resistors that are included, in accordance with conventional practice, for the sole purpose of limiting currents to safe values and that would be recognized as such by anyone skilled in the telegraphic art, I have omitted specific reference to them in this specification in the belief that such omission would improve its clarity and brevity.

In each reference made herein to the rings of distributors, ring 1 (or R1) is the outside ring, ring 2 (or R2) is the second ring from the outside, etc.

Figure 6:
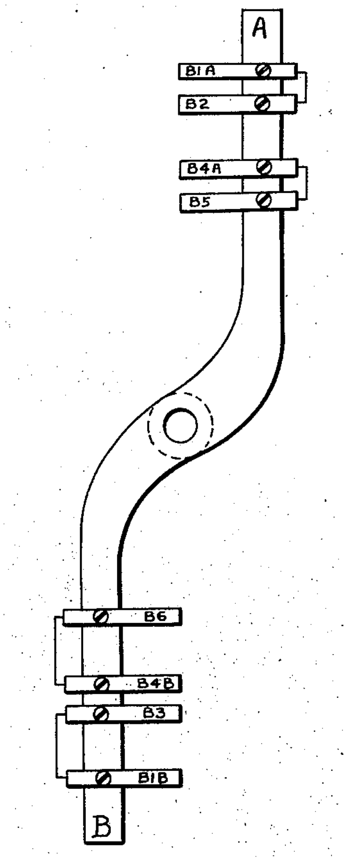
Figure 6 illustrates schematically the brush-arm and brushes to be associated with the distributor face (DF1) of Figure 1.

The brush arm of Figure 6 is mounted on a shaft so that its electrically joined pairs of brushes interconnect the rings of distributor face DF1 as follows: ring R1 and ring R2; ring R1 and ring R3; ring R4 and ring R5; and ring R4 and ring R6. These brushes are insulated from the brush arm in the conventional manner. The brush arm of Figure 6 is made sufficiently long so that either of its two ends (marked A and B) may engage with the stop-lever S2 of Figure 1, and a friction clutch permits the brush arm to be stopped while the shaft on which it is mounted continues to rotate. The aforesaid shaft is continuously rotated by an electric motor through suitable gears at a velocity (195 r.p.m. in this example) such as to complete one-half revolution in a time interval approximately equal to the duration of seven 22 millisecond units of time. To improve clarity, Figure 1 depicts only a vestigial symbol representing the brush arm in contact with stop-lever S2. Because a start-stop operated distributor brush-arm of this type is entirely conventional and well known to those skilled in the art, I have omitted from Figure 1, illustrations of the friction clutch, the gears and the motor. The two conventional rest segments each identified by the symbol R in ring R1 of distributor DF1 are electrically joined to each other and to one terminal of the spacing biased polar relay K9. The selection segments A to F and 1 to 6 of ring R1 of distributor face DF1 are connected respectively to terminals 301 to 312 of terminal board TB3 of Figure 1, and these selection segments are so placed that the brush contacting ring R1 passes the center of segment A, or of segment 1, 11-milliseconds after the release of the brush-arm by stop-lever S2 and so that the brush passes the centers of segments B to F or of segments 2 to 6 at succeeding 22 millisecond intervals. The width of these segments is such that brush contact endures for approximately five milliseconds.

Assume that the brush arm is stopped with the A end in contact with stop-lever S2. The continuously present positive potential on segment R5 of DF1 will be conducted through brush B5, brush B4A, segment R4 to the tongue of relay K9. When a spacing start signal is received from the remote subscriber, the armature of relay K6 delivers a positive potential through the armature of relay K7 to (say) ring R3, through brushes B3 and B1B to the uppermost R segment of ring 1 to magnet M2 and to relay K9. The resulting current flow to their negative terminals energizes both magnet M2 and relay K9. An alternate path of the same positive potential to magnet M2 and relay K9 would be from the armature of relay K7 to ring R2, through brushes B2 and B1A to the lower R segment of ring 1. Energizing magnet M2 releases the brush-arm. Energizing relay K9 results in delivery of the positive potential previously described as existing on the armature thereof to caapcitor C20. There results a surge of positive current through capacitor C20, through terminal 322 of TB3, through terminal 122 of TB1 (Figure 2), through ring 12 (innermost ring) of DF2, through brushes B212 and B206 (Figure 7), through one of the several electrically joined segments marked A–F or through one of the several electrically joined segments marked 1–6 (Figure 2), through terminal 115 (or 116) of TB1, through terminal 315 (or 316) of TB3 (Figure 1), through one of two windings of relay K7, through one of two windings of relay K8, and thence to ground. If this positive surge passes through terminal 315 (because it came from an A–F segment of DF2) its flow through the associated windings of relays K7 and K8 is in such a direction as to cause the magnets of both relays to repel their armatures. If this positive surge passes through terminal 316 (because it came from a 1–6 segment), the magnets of relays K7 and K8 attract their armatures. The contacts of relay K8 apply holding potential to the holding windings of relays K7 and K8 in the conventional manner to make these relays "side-stable." In consequence of the foregoing, a spacing starting element received from the remote sending subscriber when the A end of the brush arm associated with DF1 is in contact with stop-lever S2 and when the brush B206 associated with ring 6 of DF2 is anywhere within one of the segments marked A–F, will position the armature of relay K7 so that the remainder of that start element and the successive selection elements are delivered to ring R3 of DF1, thence through brush B3 to brush B1B which will deliver the elements successively to segments A to F of ring 1 of DF1 and thereby charge to corresponding polarity the capacitors connected respectively to terminals 301 to 306. Should the brush B206 have been anywhere within one of the segments marked 1–6 in ring 6 of DF2, the spacing start element mentioned above would have positioned the armature of relay K7 so that the remainder of the start element and the succeeding selection elements would have been delivered to ring R2 of DF1, thence through brush B2 to brush B1A which could have delivered the elements successively to segments 1 to 6 of ring 1 of DF1 and thereby charged to corresponding polarity the capacitors connected respectively to terminals 307 to 312 of TB3.

If the brush arm associated with DF1 is stopped with the B end thereof in contact with stop-lever S2, the negative potential that resides continually on segment R6 of DF1 would pass through brushes B6 and B4B to segment R4 of DF1 and appear on the armature of relay K9. A start element received from the remote sending subscriber would then close the contacts of relay K9 and deliver a negative surge of current through terminal 315 or 316 to the associated windings of relays K7 and K8. This negative surge positions relays K7 and K8 in a sense opposite to that previously described for the positive surge and results in the successive elements of the incoming character being delivered to the segments A through F of ring 1 of DF1 if the start pulse occurred when brush B206 associated with ring 6 of DF2 was in contact with a segment marked A–F, or results in their being delivered to the segments 1 to 6 of DF1 if the start pulse occurred when brush B206 was in contact with a segment marked 1–6 in ring 6 of DF2. Capacitor C20 is shunted by resistor R20 of such value as to assure the complete dissipation of all residual charge in a time less than the interval between successive start pulses received at terminal board TB6.

The positive, negative, and ground potentials utilized in the circuits of Figure 1 are obtained from the power supply of the associated sending multiplex terminal through terminals 508, 506, and 507, respectively, of terminal board TB5 (Figure 1).

The apparatus thus far described and depicted in Figure 1 may be called a "sending start-stop to synchronous converter," and will be referred to hereinafter as the "sending converter."

Terminals 301 to 312 of TB3 (Figure 1) each have a potential proportional to the charge on the plate of the capacitor shown to be associated respectively therewith. The opposite plate of each of these capacitors is shown to be grounded. These potentials are conducted through the associated terminals 101 to 112 of TB1 (Figure 2) respectively to segments A to F and to segments 1 to 6 of rings 1 to 5 of output distributor DF2 wherein all segments bearing identical symbols are electrically joined to each other, that is A to A, B to B, etc., 1 to 1, 2 to 2, 1–6 to 1–6, etc.

Thirty of the remaining segments in rings 1 to 5 of DF2 are marked with plus signs. These are electrically joined together and connected to terminal 114 of TB1, thence to terminal 314 of TB3 (Figure 1) and to positive battery through a current limiting resistor. Similarly, the remaining thirty segments in rings 1 to 5 of DF2 that are marked with minus signs are electrically joined and connected through terminals 113 and 313 and a current limiting resistor to negative battery. Terminals 117 to 122 of TB1 are respectively connected to rings 7 to 12 of DF2.

Figure 7:
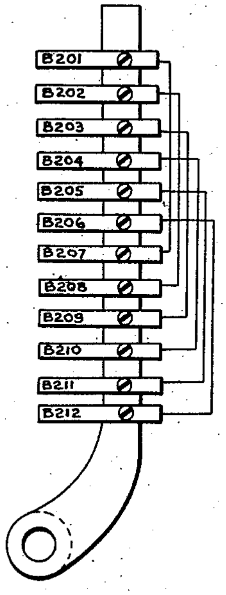
Figure 7 illustrates schematically the brush-arm and brushes to be associated with the distributor face (DF2) of Figure 2, and also the brush-arm and brushes to be associated with the distributor face (DF3) of Figure 5.

The brush arm of Figure 7 is mounted on a shaft so that its electrically joined pairs of brushes interconnect rings of distributor face DF2 as follows: rings 1 and 7; rings 2 and 8; rings 3 and 9; rings 4 and 10; rings 5 and 11; and rings 6 and 12. The aforesaid shaft and its brush arm is rotated at an angular velocity of 25 revolutions per minute, through appropriate gears, by a synchronous motor that is operated from the same A.C. power source as the synchronous motor which, through appropriate gears, drives the distributor brushes of an associated sending multiplex equipment at an angular velocity of 300 revolutions per minute. The former power source may be independent of the latter provided that their frequencies are locked. Because they are relatively conventional and well known to those skilled in the art, I have omitted from Figure 2 illustrations of the motor and gears that drive the brush arm shaft of the distributor DF2.

At an angular velocity of 25 r.p.m., the brush-arm associated with output distributor DF2 completes a clockwise revolution every 2400 milliseconds. In the following description of the use of distributor DF2 in practising my invention, all angular measurements are expressed in milliseconds (ms.) to facilitate the use of Figure 2 as a timing diagram. The reference point of zero (and 2400) milliseconds is the counterclockwise edge of segment 1 in ring 1. Each millisecond of clockwise brush travel is equivalent to 0.15 arc degrees.

In ring 1 of DF2 the counterclockwise edges of all segments that are identified by single letters or by one digit numbers are situated as follows (measured clockwise from the reference point): 0 ms., 200 ms., 400 ms., etc., at 200 ms. intervals. Each such segment is 30 ms. long.

In ring 2 of DF2 the counterclockwise edges of all segments that are identified by single letters or by one digit numbers are situated as follows (measured clockwise from the reference point): 30 ms., 230 ms., 430 ms., etc., at 200 ms. intervals. Each such segment is 30 ms. long. These segments are offset by 30 ms. clockwise from the aforesaid segments in ring 1. The corresponding segments of rings 3, 4 and 5 are respectively offset clockwise by 30 ms. from the segments of rings 2, 3, and 4 and each is 30 ms. long.

In ring 1 of DF2 the counterclockwise edges of all segments that are identified by plus or minus signs are situated as follows (measured clockwise from the reference point): 140 ms., 340 ms., 540 ms., etc., at 200 ms. intervals. Each such segment is 30 ms. long.

In ring 2 of DF2 the counterclockwise edges of all segments that are identified by plus or minus signs are situated as follows (measured clockwise from the reference point): 160 ms., 360 ms., 560 ms., etc., at 200 ms. intervals. Each segment is 30 ms. long. These segments are offset by 20 ms. clockwise from the aforesaid plus and minus segments in ring 1. The corresponding segments of rings 3, 4, and 5 are respectively offset by 20 ms. from the plus and minus segments of rings 2, 3, and 4, and each is 30 ms. long.

In ring 6 of DF2, the centers of the short insulating spaces between segments marked A–F and segments marked 1–6 are situated as follows (measured clockwise from the reference point): 149 ms., 389 ms., 629 ms., 869 ms., etc., at intervals of 240 ms.

Figures 3, 4:
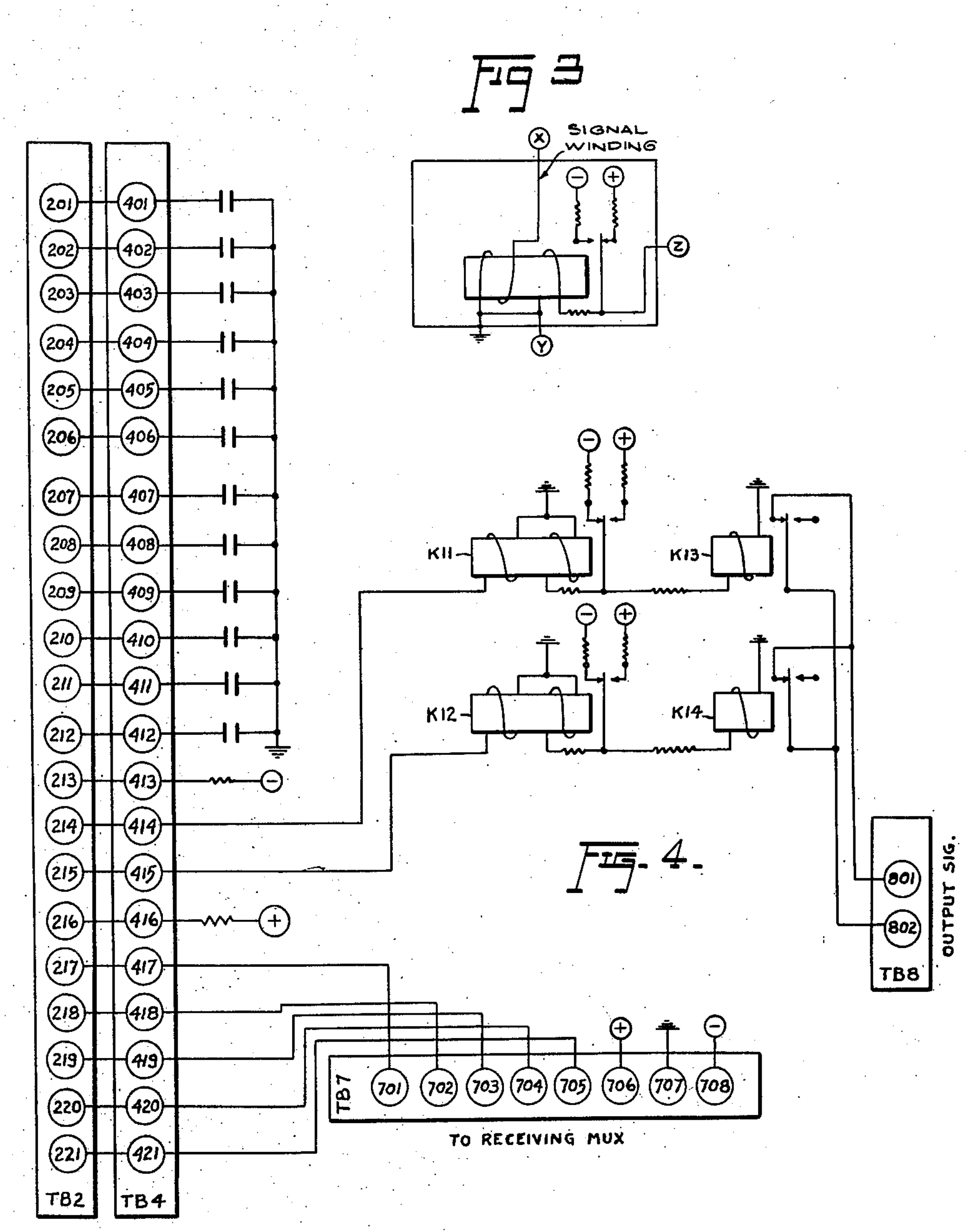

Brush B201 (Figure 7) associated with ring 1 of DF2 (Figure 2) sequentially conducts the potential of each successive clockwise segment of ring 1 through brush B207 (Figure 7), through ring 7 of DF2 to terminal 117 of terminal board TB1, thence through terminal 317 of TB3 (Figure 1) to terminal X of the side stable polar relay K1, through the signal winding thereof (as shown in Figure 3), and thence to ground at terminal Y of relay K1. The details of relay K1 are illustrated in Figure 3 which also serves to illustrate the details of relays K2 to K5, inclusive. In consequence of the foregoing, relay K1 is caused to assume a position of marking (negative) or spacing (positive), in accordance with the polarity of the charges on the segments of ring 1, and to change its position only when it receives a charge of opposite polarity from another segment of ring 1.

In a manner similar to the foregoing, relays K2 to K5, respectively, are caused to assume marking or spacing positions by the charges received from the several segments of rings 2 to 5, respectively, of DF2. The charges on segments 1 to 6 and segments A to F, inclusive, of DF2 originate in the capacitors that are respectively associated with terminals 301 to 312 of Figure 1. The said capacitors may be charged in the manner previously described through the action of the brushes associated with DF1 (Figure 1). These capacitors are completely discharged each time that they are connected to a relay (K1 to K5, inclusive) through the action of the brushes associated with DF2 (Figure 2).

For brevity, these capacitors are sometimes identified herein by the same symbol (301 or 302, etc.) that identifies the terminal of TB3 to which each is connected. They serve the purpose of signal element storage devices.

In Table I, following, the positions of relays K1 to K5 at various intervals of time are designated by the symbols "M" (marking or negative), "S" (spacing or positive), or by the symbol for segments 1 to 6 and A to F, respectively, when the condition of the relay is determined by the corresponding segment of DF2 that may be either positive or negative. The instant of time that a relay first assumes a designated position is listed in Table I in the ms. (milliseconds) column to the left of the column containing the "pos'n" (position) symbol, and the instant of time that a relay may change to the opposite position is listed in Table I in the ms. (milliseconds) column to the right of the column containing the "pos'n" symbol. The data tabulated in Table I may be computed from the parameters of DF2 as set forth in earlier paragraphs. Table I is divided by dotted lines into six "frames or blocks." The table is most easily understood if the second frame from the top is imagined to be an extension (to the right) of the top frame and if the third frame from the top is imagined to be a right hand extension of the relocated second frame, etc.

*Table I*

| Relay | ms. | Pos'n | ms. | Pos'n | ms. | Pos'n | ms. | Pos'n | ms. |
|---|---|---|---|---|---|---|---|---|---|
| K1 | 2,340 | M | 0 | 1 | 140 | S | 200 | 6 | 340 |
| K2 | 2,360 | S | 30 | 2 | 160 | M | 230 | A | 360 |
| K3 | 2,380 | M | 60 | 3 | 180 | S | 260 | B | 380 |
| K4 | 0 | S | 90 | 4 | 200 | M | 290 | C | 400 |
| K5 | 20 | M | 120 | 5 | 220 | S | 320 | D | 420 |
| K1 | 340 | M | 400 | E | 540 | S | 600 | 4 | 740 |
| K2 | 360 | S | 430 | F | 560 | M | 630 | 5 | 760 |
| K3 | 380 | M | 460 | 1 | 580 | S | 660 | 6 | 780 |
| K4 | 400 | S | 490 | 2 | 600 | M | 690 | A | 800 |
| K5 | 420 | M | 520 | 3 | 620 | S | 720 | B | 820 |
| K1 | 740 | M | 800 | C | 940 | S | 1,000 | 2 | 1,140 |
| K2 | 760 | S | 830 | D | 960 | M | 1,030 | 3 | 1,160 |
| K3 | 780 | M | 860 | E | 980 | S | 1,060 | 4 | 1,180 |
| K4 | 800 | S | 890 | F | 1,000 | M | 1,090 | 5 | 1,200 |
| K5 | 820 | M | 920 | 1 | 1,020 | S | 1,120 | 6 | 1,220 |
| K1 | 1,140 | M | 1,200 | A | 1,340 | S | 1,400 | F | 1,540 |
| K2 | 1,160 | S | 1,230 | B | 1,360 | M | 1,430 | 1 | 1,560 |
| K3 | 1,180 | M | 1,260 | C | 1,380 | S | 1,460 | 2 | 1,580 |
| K4 | 1,200 | S | 1,290 | D | 1,400 | M | 1,490 | 3 | 1,600 |
| K5 | 1,220 | M | 1,320 | E | 1,420 | S | 1,520 | 4 | 1,620 |
| K1 | 1,540 | M | 1,600 | 5 | 1,740 | S | 1,800 | D | 1,940 |
| K2 | 1,560 | S | 1,630 | 6 | 1,760 | M | 1,830 | E | 1,960 |
| K3 | 1,580 | M | 1,660 | A | 1,780 | S | 1,860 | F | 1,980 |
| K4 | 1,600 | S | 1,690 | B | 1,800 | M | 1,890 | 1 | 2,000 |
| K5 | 1,620 | M | 1,720 | C | 1,820 | S | 1,920 | 2 | 2,020 |
| K1 | 1,940 | M | 2,000 | 3 | 2,140 | S | 2,200 | B | 2,340 |
| K2 | 1,960 | S | 2,030 | 4 | 2,160 | M | 2,230 | C | 2,360 |
| K3 | 1,980 | M | 2,060 | 5 | 2,180 | S | 2,260 | D | 2,380 |
| K4 | 2,000 | S | 2,090 | 6 | 2,200 | M | 2,290 | E | 0 |
| K5 | 2,020 | M | 2,120 | A | 2,220 | S | 2,320 | F | 20 |

Terminals 501 to 505, respectively, (Figure 1) may be connected to the input of one channel of a sending multiplex in such manner that the armatures of relays K1 to K5, respectively, perform the function that is normally performed by the five sensing contacts of a tape reader such as, for example, the tape reader designated by symbol 51 in Figure 1 of British patent specification 670,758 wherein there is described a four channel multiplex that is capable of processing teleprinter characters having only five units of information per character. The output circuits of the sending mutator comprise the terminals 501 to 505 and the circuits connected thereto.

A mechanical differential (not shown) is provided as part of the drive shaft of the brush-arm of distributor DF2 so that when the brush-arm is in motion the brushes may be phased to the sending multiplex. Optimum phase is indicated by the center of the phasing range within which the multiplex channel accepts without error (from relays K1 to K5) signals representative of the charges on the segments of rings 1 to ring 5 of DF2.

The tolerance or "range" of acceptable phase adjustment of the brush-arm of DF2 is plus or minus 25 ms. from optimums as will be demonstrated in the following: If the brushes of DF2 are at phase position 80 ms. at the start of the five sequential 10 ms. sampling intervals of the multiplex, the said brushes will be at the following positions at the beginning and end of each of the said 10 ms. intervals: 80–90 ms., 90–100 ms., 100–110 ms., 110–120 ms., 120–130 ms. Reference to Table I will indicate that during each of the said 10 ms. time intervals relays K1 to K5 respectively will be in positions corresponding to the polarity of segments 1 to 5, respectively, of DF2. Had the brushes of DF2 been at phase position 130 ms. at the start of the above stated sampling intervals, the brushes of DF2 would have been at the following positions at the beginning and end of each of said sampling intervals: 130–140 ms., 140–150 ms., 150–160 ms., 160–170 ms., and 170–180 ms. Reference to Table I will indicate that during each of the said 10 ms. intervals relays K1 to K5, respectively, will still be in positions corresponding to the polarity of segments 1 to 5, respectively, of DF2. In consequence of the foregoing, it will be noted that, at the start of the period during which the multiplex is to sample the polarity of segments 1 to 5 of DF2 in the order of 1, 2, 3, 4, 5, the brushes of DF2 may have any phase position between the limits of 80 and 130 ms. Optimum phase position is midway between these limits, viz., at 105 ms., and the tolerance or range of phase adjustment will be plus or minus 25 ms.

Similar analysis will indicate that, at the start of the period during which the multiplex is to sample the polarity of segments 6 to D of DF2 in the order of 6, A, B, C, D, the brushes of DF2 may have any phase position between the limits of 280 and 330 ms. and that the optimum phase is midway between the two, viz., at 305 ms. This optimum phase position of 305 ms. is displaced by 200 ms. from the first described optimum phase position (105 ms.) as is to be expected because the multiplex repeats its sampling cycle at 200 ms., intervals.

In consequence of the foregoing, it will be noted that the optimum phase position of the brushes of DF2 at the beginning of the sampling cycle of the sending multiplex is any one of the following: 105 ms., 305 ms., 505 ms., 705 ms., 905 ms., 1105 ms., 1305 ms., 1505 ms., 1705 ms., 1905 ms., 2105 ms., or 2305 ms.

A stroboscopic light source (pulsed once at a predetermined instant during each cycle of the sending multiplex) may be used to illuminate the brush-arm of DF2 to facilitate adjustment of the brushes to optimum phase position.

It has been stated previously that the capacitors that are respectively associated with terminals 301 to 312 inclusive are completely discharged each time that they are connected to any relay K1 to K5 via the brushes of DF2. If no teleprinter signals enter terminals 601 and 602 of Figure 1, the brush-arm of DF1 (Figure 1) will not revolve, and the said capacitors will receive no new charges. Reference to Table I and to preceding paragraphs will indicate that under these conditions the positions of the side-stable polar relays K1 to K5 are influenced only by the charges that appear on the segments of rings 1 to 5 of DF2 that are marked with plus signs or minus signs, and that in consequence the signals sampled by the sending multiplex during successive cycles will be MSMSM SMSMS MSMSM etc. Signals of this type are often called "reversals." Their presence in the multiplex channel serves to assist the receiving multiplex in maintaining its correct phase at times when no teleprinter signals are traversing the channel. The manner in which these reversals are deleted by the receiving mutator will be discussed in later paragraphs.

The next following paragraphs will describe the manner in which the brushes of the start-stop actuated input distributor of DF1 (Figure 1) deliver charges to the capacitors 301 to 312 only at times when each of said capacitors is not being discharged by the action of the brushes of DF2 (Figure 2).

As described in earlier paragraphs, whenever the brush associated with ring 6 of DF2 (Figure 2) is in contact with a segment marked A–F, the start and selection pulses of a teleprinter character entering terminals 601 and 602 (Figure 1) will be delivered to capacitors 301 to 306 (Figure 1) that are respectively associated with the segments A to F in rings 1 to 5 of DF2 (Figure 2), and whenever the brush associated with ring 6 of DF2 (Figure 2) is in contact with a segment marked 106, the start and selection pulses of a teleprinter character entering terminals 601 and 602 (Figure 1) will be delivered to capacitors 307 to 312 (Figure 1) that are respectively associated with the segments 1 to 6 in rings 1 to 5 of DF2 (Figure 2).

In the embodiment being described, the distributor face DF1 has been proportioned to accept start-stop teleprinter signals having start and selection pulses that are 22 ms. in duration. Assume that the beginning of the start pulse of a teleprinter signal is delivered to terminals 601 and 602 (Figure 1) at the instant that the brush associated with ring 6 of DF2 (Figure 2) is at position 868.5 ms., that is, the brush is about to leave a segment marked 1–6. The start pulse of the incoming teleprinter signal will charge capacitor 307 during a period starting 8.5 ms. later, namely, during the period 877–882, and the selection pulses will charge capacitors 308 to 312, respectively, during subsequent 5 ms. intervals that are separated from each other by 22 ms., namely, during the intervals 899–904 ms., 921–926 ms., 943–948 ms., 965–970 ms., and 987–992 ms. The 8.5 ms. delay derives from the fact that the center of segment 1 of DF1 is situated 11 ms. from the start position of the brush of DF1 and the segment is 5 ms. wide. Reference to Figure 2 and to Table I will indicate that within the span of the time intervals listed above, capacitor 307 that is associated with a segment marked 1 in DF2 will be discharged during the time interval 920–950 ms. This discharge interval is separated by 38 ms. from the above stated charging interval of 877–882 ms. Capacitor 308 that is associated with a segment marked 2 in DF2 will be discharged during the interval 1000–1030 ms. that is separated by 96 ms. from the above stated charging interval. By inspection of Figure 2, it is apparent that the separation between the charging interval and the discharging interval of capacitors 309 to 312 is respectively greater than 96 ms. Had the brush position been 629.5 ms. (just entering a segment marked 1–6) at the beginning of the start pulse of the teleprinter character entering terminals 601 and 602 (Figure 1), the separation between the charging and discharging intervals would have been still greater. The separation between charging and discharging intervals is nowhere less than 38 ms.

Assume that the beginning of the start pulse of a teleprinter signal is delivered to terminals 601 and 602 (Figure 1) at the instant that the brush associated with ring 6 of DF2 (Figure 2) is at position 149.5 ms., that is, the brush has just entered a segment marked 1–6. The start pulse of the incoming teleprinter signal will charge capacitor 307 during a period starting 8.5 ms. later, namely, during the period 158–163 ms., and the selection pulses will charge capacitors 308 to 312 respectively during subsequent 5 ms. intervals that are separated from each other by 22 ms., namely, during the intervals, 180–185 ms., 202–207 ms., 224–229 ms., 246–251 ms., and 268–273 ms. Reference to Figure 2 and to Table I will indicate that within the span of the time intervals listed above, capacitor 307 that is associated with a segment marked 1 in DF2 will have been discharged previously during the time interval 0–30 ms. which is 128 ms. earlier than the above listed charging interval, and that capacitor 312 that is assosiated with a segment marked 6 in DF2 will have been discharged previously during the time interval 200–230 ms. which is only 38 ms. earlier than the above listed charging interval of 268–273 ms. By inspection of Figure 2, it is apparent that the separation between the charging interval of capacitors 308 to 311 and their previous discharging interval is never less than 38 ms. Had the brush position been 388.5 ms. (just leaving a segment marked 1–6) at the beginning of the start pulse of the teleprinter character entering terminals 601 and 602 (Figure 1), the separation between the charging intervals and the preceding discharging intervals would have been still greater. The separation between charging intervals and preceding discharging intervals is nowhere less than 38 ms.

Reference to Table I indicates that, if capacitors 301 to 312 are recharged after every discharge, the signal sampled by the sending multiplex (from relays K1 to K5 of Figure 1) will change, from the "reversals" previously described, to the form depicted in Table II below:

*Table II*

| | | | | | |
|---|---|---|---|---|---|
| 12345<br>ABCDE | 6ABCD<br>F1234 | EF123<br>56ABC | 456AB<br>DEF12 | CDEF1<br>3456A | 23456<br>BCDEF |

In Table II, each letter or numeral symbol represents a pulse that is either negative or positive depending on the polarity of the segments of DF2 that are respectively represented by the aforesaid symbols.

Since the recharging of capacitors 301 to 312 is accomplished through the action of the brushes of DF1 (Figure 1), then it is apparent that the group of symbols 123456, and also the group of symbols ABCDEF, represents the group of teleprinter signals that entered terminals 601 and 602 of Figure 1. In each instance the first pulse (1 or A) is the start pulse of each incoming teleprinter character and the remainder (23456 or BCDEF) represent the selection pulses. In consequence of the foregoing, it will be observed that the sending unit of this printing telegraph signal mutator (which includes a "start-stop to synchronous" converter) has transmuted 60 teleprinter pulses that entered the sending mutator in the form of ten six-pulse groups and has delivered the 60 pulses to the sending synchronous signal transmission facility or sending multiplex (via output circuit terminals 501–505) in the form of 12 five-pulse groups.

The manner in which the receiving mutator (receiving unit of this printing telegraph signal mutator) accepts 12 five-pulse groups from the receiving synchronous signal transmission facility or receiving multiplex and transmutes the consequent 60 pulses into ten six-pulse groups will be described in the following paragraphs which also include a description of the "synchronous to start-stop" converter (hereinafter called the "receiving converter") that adds a stop pulse to each six-pulse group and delivers the resulting start-stop teleprinter signals to the distant receiving teleprinter.

In the preferred embodiment of my invention the reception input terminals 701 to 705, respectively of Figure 4 may be connected to the five output segments (or output terminals) of one channel of a receiving multiplex, for example, to the conductors generally designated as 1726 in British patent specification Serial No. 670,759 which describes a receiving multiplex capable of delivering five sequential 10 ms. units of information during a 50 ms. interval every 200 ms.

Synchronous telegraph signals entering input terminals 701 to 705, respectively, are conducted to terminals 417 to 421, respectively, of TB4 (Figure 4), through terminals 217 to 221, respectively, of TB2 (Figure 5) and thence to rings 8 to 12, respectively, of distributor DF3. Rings 8 to 12, in cooperation with rings 2 to 6 respectively, comprise the input signal distributor of the receiving signal mutator. The rings of DF3 are numbered sequentially, ring 1 being the outermost and ring 12 being the innermost. Ring 1 in cooperation with ring 7 of DF3 comprises the output distributor and the output "synchronous to start-stop" converter of the receiving signal mutator.

Associated with distributor face DF3 (Figure 5) there is a brush rigging (brush-arm) as illustrated in Figure 7 that is identical to the brush rigging associated with DF2 (Figure 2). The brush rigging associated with DF3 is mounted on a shaft that is rotated at an angular velocity of 25 r.p.m. through appropriate gears by a synchronous motor operated from the same A.C. power source as the synchronous motor which, through appropriate gears, drives the distributor brushes of the associated receiving multiplex at an angular velocity of 300 r.p.m. The former power source may be independent of the latter provided that their frequencies are locked. Because they are entirely conventional and well known to those skilled in the art, I have omitted from Figure 5 illustrations of the motor and gears that drive the brush-arm and shaft of the distributor DF3.

The electrically joined pairs of brushes of the brush-arm of Figure 7 interconnect the rings of distributor face DF3 as follows: rings 1 and 7, rings 2 and 8, rings 3 and 9, rings 4 and 10, rings 5 and 11, and rings 6 and 12.

At an angular velocity of 25 r.p.m. the brush arm associated with distributor DF3 completes a clockwise revolution every 2400 ms. In the following description of the use of distributor DF3 in practicing my invention, all angular measurements are expressed in milliseconds (ms.) to facilitate the use of Figure 5 as a timing diagram. The reference point of zero (and 2400) milliseconds is the counterclockwise edge of segment 1 in ring 2. Each millisecond of clockwise brush travel is equivalent to 0.15 arc degree.

In ring 1 of DF3 the counterclockwise edges of all segments marked "A" or "1" are situated as follows (measured clockwise from the reference point): 10 ms., 250 ms., 490 ms., etc., at 240 ms. intervals. In ring 1, the counterclockwise edges of a group of segments A, B, C, D, E, F, and M are separated from each other by 22 ms. and each segment is 8 ms. long. In ring 1, the counterclockwise edges of a group of segments 1, 2, 3, 4, 5, 6, and M are separated from each other by 22 ms. and each segment is 8 ms. long. In ring 1 of DF3, the counterclockwise edges of the segments marked with a plus sign are situated as follows: 196 ms., 436 ms., 676 ms., etc., at 240 ms. intervals. Each such segment is 8 ms. long.

In ring 7 of DF3, the centers of segments marked "S" are radially coincident with the centers of the segments marked "A" or "1" or "M" in ring 1 and each has a span of 20 ms. The centers of certain of the segments marked "T" in ring 7 are radially coincident with the centers of segments marked "D" or "4" in ring 1 and their span is 108 ms. The centers of the remainder of the segments marked "T" in ring 7 are radially coincident with the centers of the segments of ring 1 that are marked with a plus sign, and their span is 20 ms.

In ring 2 of DF3 the counterclockwise edges of all segments are situated as follows (measured clockwise from the reference point): 0 ms., 200 ms., 400 ms., etc., at 200 ms. intervals. Each such segment is 60 ms. long.

In ring 3 of DF3, the counterclockwise edges of all segments are situated as follows: 10 ms., 210 ms., 410 ms., etc., at 200 ms. intervals. Each such segment is 60 ms. long. These segments are offset clockwise by 10 ms. from the aforesaid segments in ring 2. The corresponding segments of rings 4, 5, and 6 are respectively offset clockwise by 10 ms. from the segments of rings 3, 4, and 5, and each is 60 ms. long.

On distributor DF3, all segments bearing identical letters, numbers, or symbols are electrically connected to each other. Segments marked A to F and segments marked 1 to 6 in rings 1 to 6 are connected through terminals 201 through 212, respectively, of terminal board TB2 to terminals 401 through 412, respectively of TB4 (Figure 4) where each is respectively connected to the ungrounded plate of a capacitor as illustrated in Figure 4. These capacitors function as reception signal storage devices. Segments marked M in ring 1 are connected through terminal 213 of TB2 to terminal 413 of TB4 (Figure 4) and thence through a current limiting resistor to negative battery derived from the associated receiving multiplex terminal through terminal 708 of TB7 of Figure 4. Segments marked with a plus sign in ring 1 are connected through terminals 216 of TB2 to terminal 416 of TB4 (Figure 4) and thence through a current limiting resistor to positive battery derived from the associated receiving multiplex terminal through terminal 706 of TB7 of Figure 4.

If the brush-arm of DF3 is properly phased to the associated receiving multiplex, the five sequential 10 ms. signals, delivered every 200 ms. by the receiving multiplex to terminals 701 to 705 of Figure 4, will be conducted to rings 8 to 12 of DF3 and will be distributed, through brush pairs B208/B202, B209/B203, B210/B204, B211/B205, and B212/B206 of (Figure 7), respectively, to the segments of rings 2 to 6, respectively, of DF3 and thence through terminals 201 to 212 of TB2 (Figure 5), through terminals 401 to 412 of TB4 (Figure 4), to the capacitors associated with terminals 401 to 412. The said signals delivered by the associated receiving multiplex will therefore charge capacitors 401 to 412 either positively or negatively in accordance with the polarity of the signals delivered by the associated receiving multiplex.

A mechanical differential (not shown) is provided as part of the drive shaft of the brush-arm of DF3 so that when the brush-arm is in motion the brushes may be phased to the associated receiving multiplex. Optimum phase is indicated by the center of the phasing range within which the signals delivered by the associated receiving multiplex are distributed without error to designated ones of capacitor group 401–412.

Table II hereof indicates that in every twelfth cycle of the associated multiplex, the sending multiplex signal consists of five sequential 10 ms. elements having polarities respectively representative of the polarities of segments 1, 2, 3, 4, 5 (in that order) of the sending mutator's distributor DF2 (Figure 2). This particular multiplex sequence is hereinafter called the "12345 sequence." The optimum phase position of the brushes of DF3 (Figure 5) is such that the brushes of DF3 are in a position 25 ms. clockwise from the counterclockwise edge of segment 1 of ring 2 at the instant that the start of the 12345 sequence is delivered by the receiving multiplex to input terminals 701 to 705 of Figure 4. Inspection of the parameters of DF3 indicates that the tolerance or "range" of this phase adjustment is plus or minus 25 ms. from optimum and that the particular 12345 sequence of multiplex signals will be delivered in that order to the segments 12345 (in that order) of DF3 whereby they are caused to charge the capacitors 407 to 411 (in that order) either positively or negatively in accordance with the polarity of the elements comprising the particular 12345 sequence of multiplex signals.

Reference to Table II and to preceding paragraphs indicates that the start of each multiplex cycle occurs 200 ms. after the start of the preceding cycle and that the sequence 6ABCD is transmitted by the sending mutator following the sequence 12345. Reference to preceding paragraphs and to Figure 5 indicates that the sequence 6ABCD (in that order) will be delivered by the brushes of DF3 to the segments 6ABCD (in that order) of DF3 whereby the elements of the sequence are caused to charge capacitors 412, 401, 402, 403, and 404 (in that order) either positively or negatively in accordance with the polarity of the elements comprising the 6ABCD sequence of multiplex signals, and that this cycle continues through the sequences listed in Table II.

The electrically joined brushes bearing on rings 1 and 7 of DF3 serve to discharge the capacitors 401 to 412 of Figure 4 in the following manner: Referring to the counterclockwise edge of segment 1 in ring 2 as reference time "0," the brush bearing on ring 1 of DF3 will make contact with a segment marked 1 during the time interval 250–258 ms. The brush bearing on ring 7 will make contact with a segment marked "S" during the time interval 244–264 ms. Since the brushes bearing on rings 1 and 7 are electrically joined, capacitor 407 will be discharged through segment S, through terminal 214 (Figure 5), through terminal 414 (Figure 4), and through the signal winding of the side-stable polar relay K11 to ground. If the charge on the capacitor was positive, the armature of relay K11 moves to its positive side contact which not only places holding current of positive polarity on the holding winding of relay K11 but also applies positive potential to the signal winding of polar relay K13 causing the latter to open its contacts and hence to open the output signalling circuit comprising terminals 801 and 802 of Figure 4. At this time the contacts of relay K14 are also open because during an earlier time interval, namely 196–204 ms., the brushes of rings 1 and 7 had conducted positive potential from a segment marked "plus" in ring 1 of DF3 to a segment marked T in ring 7 and thence through terminal 215 of TB2 (Figure 5), through terminal 415 of TB4 (Figure 4) and through the signal winding of the side-stable polar relay K12 to ground. Current flow in this direction through its signal winding causes the armature of relay K12 to move to its positive side-contact which not only places holding current of positive polarity on the holding winding of relay K12 but also applies positive potential to the signal winding of relay K14 causing the latter to open its contacts.

The brush bearing on ring 1 of DF3 will make contact with a segment marked "2" during the time interval 272–280 ms. The brush bearing on ring 7 will make contact with a segment marked "T" during the time interval 266–374 ms. Since the brushes bearing on rings 1 and 7 are electrically joined, capacitor 407 will be discharged via segment T, terminals 215 and 415, and relay K12 to ground. If the charge of capacitor 407 was positive, said discharge will leave the armature of relay K12 on its positive side-contact and leave the contacts of relay K14 open or, if the charge was negative, move the armature of relay K12 to its negative side-contact and close the contacts of relay K14.

To recapitulate the preceding paragraphs, the contacts of relay K14 were already open at the time 250 ms. when the positive charge on a segment marked 1 in ring 1 of DF3 opened the contacts of relay K13 thus opening the circuit of terminals 801 and 802 that constitute the output signalling circuit. The opening of the contacts of relay K13 constitutes the beginning of the start pulse of a teleprinter signal. Twenty-two milliseconds later, namely at time 272 ms., the charge on a segment 2 of ring 1 of DF3 caused relay K14 to either remain open or to close according as to whether element 2 of the 12345 multiplex sequence was positive or negative. This constitutes the beginning of the second element (the first selection element) of a teleprinter signal. In a similar manner, the capacitors that are associated with specific segments 3, 4, 5, and 6 of ring 1 are discharged through a T segment of ring 7 and open or close the contacts of relay K14, in accordance with the polarity of each charge, at the following instants of time 294 ms., 316 ms., 338 ms., and 360 ms. At time 382 ms. the negative potential residing on an M segment of ring 1 of DF3 is conducted through an S sector of ring 7 of DF3 to relay K11 and results in the closure of the contacts of relay K13 thus marking the beginning of the stop or rest pulse of a teleprinter signal having 22 ms. elements.

At time 436 ms. the positive potential of a segment marked plus in ring 1 of DF3 will be conducted through a T segment of ring 7 of DF3 to relay K12 which will cause the contacts of relay K14 to open (if they were not already open) preparatory to the beginning of the start pulse of the next teleprinter signal which may occur by the opening of the contatcs of relay K13 at time 490 ms.

In the manner described, signals which traverse the multiplex in the form given in Table II, are delivered to the output signal terminals 801 and 802 (Figure 4) of the receiving mutator in the form:

123456 ABCDEF 123456 ABCDEF etc.

In consequence of the foregoing, it will be observed that the receiving unit of this printing telegraph signal mutator (which includes a multiplex to start-stop converter) has transmuted 60 teleprinter pulses that entered the receiving mutator in the form of twelve five-pulse groups and has delivered the 60 pulses to an output teleprinter signalling circuit in the form of ten six-pulse groups wherein each of the latter groups has added thereto a marking stop or rest pulse having a duration of 108 ms.

From the known parameters of DF3, it will be observed that no one of the capacitors associated with segments 1 to 6 and A to F is ever subject to simultaneous charging and discharging. The shortest time interval between the end of any charging cycle and the beginning of the next discharge cycle is 100 ms. and occurs between the end of the charging cycle of the capacitor associated with segment 6 (time 260 ms.) and the beginning of the discharge of that capacitor at time 360 ms. The same minimum interval occurs between the end of the charging cycle of the capacitor associated with the segment F (time 1460 ms.) and the beginning of the discharge of that capacitor at time 1560 ms.

The shortest time interval between the end of any discharging cycle and the beginning of the next recharging cycle is 102 ms. and occurs between the end of the discharging cycle of the capacitor associated with segment 1 (time 738 ms.) and the beginning of the recharge cycle of that capacitor at time 840 ms. The same minimum interval occurs between the end of the discharging cycle of the capacitor associated with segment A (time 1938 ms.) and the beginning of the recharge cycle of that capacitor at time 2040 ms.

In the preceding paragraphs, it was demonstrated that when no teleprinter signals entered the sending mutator the signal delivered to the multiplex channel would be "reversals" in the form:

MSMSM SMSMS MSMSM SMSMS MSMSM SMSMS etc.

instead of signals in the form of Table II, namely, 12345 6ABCD EF123 456AB CDEF1 23456 etc.

In the foregoing, it is to be noted that the "reversals" signal that replaces the teleprinter signals marked 1 and A is always a marking (negative) signal whereas the elements 1 and A of teleprinter signals are always spacing (positive) because they were derived from the start pulse of a teleprinter signal that was delivered to the input of the sending mutator. In consequence of the foregoing, whenever reversals traverse the multiplex channel, because teleprinter signals are not being sent, the segments marked 1 and the segments marked A in ring 1 of DF3 will have negative potentials. Whenever a segment marked 1 or A in ring 1 of DF3 has a negative potential, the contacts of relay K13 (which were closed by the preceding action of an M segment in ring 1 of DF3) remain closed for at least the duration of an entire output teleprinter character, namely, for 240 milliseconds. In consequence of the foregoing, it will be observed that when the input terminals 601 and 602 (Figure 1) of the sending converter of the sending mutator receive continuous marking current (no teleprinter signals), the output terminals 801 and 802 (Figure 4) of the receiving converter of the receiving mutator remain closed and deliver continuous marking current (no teleprinter signals) to the distant receiving teleprinter. This is so desipite the fact that the contacts of relay K14 (Figure 4) are actuated by the "reversals" in the sequence SMSMS SMSMS . . . etc.

It is of interest to note that if the remote sending subscriber sends start-stop teleprinter signals into the sending mutator at a very constant rate, say 245 o.p.m., the receiving mutator will deliver to the remote receiving subscriber start-stop teleprinter signals (at 250 o.p.m. which is five-sixths of the normal multiplex channel rate) in sequences of 49 characters separated by marking stop signals of one character duration. The receiving subscriber may pass the aforesaid received signals through the Printing Telegraph Signal Normalizer described in British patent application No. 20866/55 (U.S. Patent No. 2,721,230) and obtain from the output of the normalizer signals at 245 o.p.m. that are synchronized to those originated by the remote sending subscriber, that is, signals which follow minor speed variations of the remote sending subscriber. Such synchronized signals will cause a receiving reperforator to feed-out exactly as many feed holes per minute as were read per minute by the remote sending tape reader despite the presence of transmission disturbances.

The brushes illustrated in Figure 7 are shown to be mounted solely on one end of the brush-arm. Such illustration simplifies the explanation of the mode of operation of my invention. In practising my invention, additional space for mounting the brushes is achieved by mounting the even numbered brushes on a reverse extension of the brush-arm in the position that they would assume were they rotated through an angle of 180 degrees. To compensate for this change, the distributor faces DF2 and DF3 are constructed with the segments of their even numbered rings located 180 degrees removed from the positions illustrated in Figures 2 and 3.

In Figure 5 it will be noted that the segments of ring 1 of DF3 are only 8 ms. (1.2 degrees) wide. Whereas the diameter of distributor face DF3 may be made large in order that the linear length of these segments may be compatible with ease of fabrication, in practising my invention it is preferable to mount the segments that are shown (in Figure 5) to occupy the sector 10 to 490 ms. of rings 1 and 7, so as to occupy a 360 degree sector of a separate face plate having a brush-arm shaft geared to the brush-arm shaft of DF3 in the ratio of 5 to 1 so that the brush-arm associated with the separate face plate rotates at an angular velocity of 125 r.p.m. and so that one of its brushes contacts the counterclockwise edge of segment A thereof 10 ms. (7.5 degrees) after the brush of ring 2 of DF3 contacts the counterclockwise edge of segment 1 of DF3. Under these conditions, the length of each segment of the separate face plate will be 6 degrees and the counterclockwise edges of the segments comprising a group will be separated from each other by 16.5 degrees. Under these conditions, the mode of operation of my invention remains unchanged.

In this specification I have confined my explanation of the functioning of my invention to an electromechanical embodiment associated with a channel-sequential type of multiplex operating at a specific rate. This has been done to simplify the explanation and to clarify understanding of the basic principles. It will be immediately obvious to those skilled in the art that the function performed by the mechanical distributors can be performed with equal facility by electronic circuits wherein the active elements may be electron tubes, transistors, bi-stable magnetic cores, or their equivalents; that the storage devices or storage cells for storing signal elements, which I have described as being variously capacitors and relays, may comprise electronic circuits with equal facility; that the signal repeating or switching means or elements, which I have described as being relays and commutators, may comprise well known electronic circuits with equal effectiveness; and that obvious rearrangements of the parts will permit the invention to be associated with channel-interlaced types of multiplexes or with multiplexes operating at other rates.

I claim:

1. Printing telegraph transmission apparatus, incorporating a synchronous $n$-element per channel per cycle time-division multiplex telegraph equipment, adapted for transmission therethrough of start stop telegraph code signals wherein the start and selection elements consist of $n+x$ signal elements ($x$ being a whole number greater than zero), comprising a plurality of signal input storage-devices, means for applying to said storage devices successively the $n+x$ signal elements of successive start-stop telegraph code signals, means synchronized with said multiplex equipment for extracting said signal elements from said input storage devices in groups of $n$ elements each and transmitting same to said equipment, a plurality of reception storage devices and means for storing therein successively said $n$-element signal groups transmitted by said equipment, means for extracting said signal elements from said reception storage devices in groups of $n+x$ elements, and means controlled by said latter extracting means for locally generating additional signal elements to reproduce with said last-mentioned groups, start-stop telegraph code signals each consisting of $n+x$ signal elements plus a stop element.

2. Apparatus as claimed in claim 1, wherein the input storage devices are in two groups, comprising a start-stop actuated input distributor arranged to distribute in order the start and selection elements of a start-stop code signal to the first group of storage devices and the start and selection elements of a second start-stop code signal to the second group of storage devices, a sending distributor for extracting signals from said groups of storage devices successively, and means responsive to said sending distributor for transmitting successive groups of signal elements to said multiplex equipment.

3. Apparatus as claimed in claim 2, in combination with an input circuit introducing teleprinter signals of $n+x$ signal elements exclusive of the stop-element, wherein the input distributor is in synchronism with said input circuit and includes two groups of contacts, the contacts of the first said group being individually associated with a first group of input storage devices for energizing the latter respectively, and the contacts of the second group being individually associated with a second group of input storage devices for energizing the latter respectively, and comprising means for switching the start element and the selection elements of an initial signal to the first group of input distributor contacts in succession and thereafter for selecting between said groups of distributor contacts and for applying the start element and selection elements of succeeding signals thereto.

4. Apparatus as claimed in claim 3, for use in transmitting teleprinter signals wherein each signal is represented by a start element, five selection elements and a stop element, wherein the input distributor contacts are divided into two groups each of six contacts, associated with the start and selection elements and wherein the input storage devices are scanned by a sending distributor responsive thereto for producing successive groups of five pulses each.

5. Apparatus as claimed in claim 4, comprising means responsive to the relative phase between the sending distributor and the input distributor for controlling selection of a group of input storage devices.

6. Apparatus as claimed in claim 1, for use with a multiplex telegraph equipment, wherein the means for extracting signal elements from the input storage devices is effective in the absence of stored signal elements to transmit to the multiplex equipment a synchronous succession of binary signal elements alternating in digital significance.

7. Apparatus as claimed in claim 1, wherein the reception storage devices are in two groups, comprising means synchronized with said multiplex equipment for storing successively the said $n$-element signal groups, means synchronized with said multiplex equipment for extracting said signal elements from said reception storage devices in groups of $n+x$ elements, and means effective at the close of each $n+x$ group to add a stop element.

8. Apparatus as claimed in claim 1, wherein the means for extracting signal elements from the reception storage devices, is effective to extract said elements in groups of six elements each, the initial element of each group occupying the temporal position of a start signal element, and comprising means for generating a stop signal element at the expiration of each group of six elements.

9. Apparatus as claimed in claim 8, wherein said extracting means takes the form of a receiving distributor comprising an annulus composed of electrically common groups of twelve contacts each, and wherein the reception storage devices comprise twelve capacitors for each such contact group, said capacitors being individually energizable by said contacts.

10. Telegraph code transmitting apparatus comprising an input signal distributor responsive to start-stop telegraph code signals wherein the start and selection elements consist of $n+x$ signal elements ($n$ and $x$ being whole numbers greater than zero), in combination with a plurality of signal storage devices and means for applying to said signal storage devices successively the $n+x$ signal elements of successive start-stop telegraph code signals, in combination with means comprising an output distributor for extracting said signal elements from said signal storage devices successively in groups of $n$ signal elements each, and means comprising output circuits for delivering said groups of $n$ signal elements to a synchronous $n$-element per cycle signal transmission facility.

11. Telegraph code receiving apparatus comprising an input signal distributor responsive to synchronous telegraph signals comprising $n$ signal elements per group, in combination with a plurality of signal storage devices and means for applying to said signal storage devices successively the signal elements comprising each group of $n$ signal elements, in combination with means comprising an output distributor for extracting said signal elements from said signal storage devices successively in groups of $n+x$ signal elements ($n$ and $x$ being whole numbers greater than zero) and for adding a locally generated stop element to each group of $n+x$ signal elements, and means comprising output circuits for delivering to a start-stop telegraph signal transmission facility successive groups of $n+x$ signal elements each group being followed by a locally generated stop element.

12. Apparatus as claimed in claim 10, wherein said output distributor includes means for delivering to said output circuits, in the absence of stored signal elements, a synchronous succession of binary signal elements alternating in digital significance.

13. Apparatus as claimed in claim 11, wherein said output distributor and said output circuits include means for delivering to said start-stop telegraph signal transmission facility a continuous stop signal whenever said signal storage devices contain a succession of binary signal elements alternating in digital significance.

14. A Code Converter system comprising a source of input signals having $n+x$ permutation elements per group, an input distributor having input terminals coupled to said source and also having output terminals, a plurality of signal storage devices coupled to the output terminals of said input distributor, an output distributor having input terminals coupled to said storage devices and also having output terminals for delivering output signals corresponding to the input permutation elements unchanged in sequence but regrouped into groups having $n$ permutation elements per group such that the total quantity of output groups multiplied by the quantity of permutation elements per output group is equal to the total quantity of input groups multiplied by the quantity of permutation elements per input group.

15. A Code Converter system comprising a source of input signals having $n$ permutation elements per group, an input distributor having input terminals coupled to said source and also having output terminals, a plurality of signal storage devices coupled to the output terminals of said input distributor, an output distributor having input terminals coupled to said storage devices and also having output terminals for delivering output signals corresponding to the input permutation elements unchanged in sequence but regrouped into groups having $n+x$ permutation elements per group such that the total quantity of output groups multiplied by the quantity of permutation elements per output group is equal to the total quantity of input groups multiplied by the quantity of permutation elements per input group.

References Cited in the file of this patent

UNITED STATES PATENTS

| | | |
|---|---|---|
| 2,442,301 | Locke | May 25, 1948 |
| 2,716,156 | Harris | Aug. 23, 1955 |
| 2,724,739 | Harris | Nov. 22, 1955 |
| 2,879,332 | Reek | Mar. 24, 1959 |